United States Patent
Crudele et al.

(10) Patent No.: US 10,606,850 B2
(45) Date of Patent: Mar. 31, 2020

(54) UPDATING A KNOWLEDGE BASE OF A SPAM DETECTION SYSTEM

(71) Applicant: International Business Machines Corporation, Armonk, NY (US)

(72) Inventors: Michele Crudele, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 15/711,396

(22) Filed: Sep. 21, 2017

(65) Prior Publication Data
US 2019/0087428 A1 Mar. 21, 2019

(51) Int. Cl.
*G06F 16/00* (2019.01)
*G06F 16/2457* (2019.01)
(Continued)

(52) U.S. Cl.
CPC ...... *G06F 16/24578* (2019.01); *G06F 16/243* (2019.01); *G06F 17/10* (2013.01);
(Continued)

(58) Field of Classification Search
CPC .. G06F 16/243; G06F 16/24578; G06F 17/10; G06F 17/2765; G06F 21/00; H04L 51/12; H04L 51/30
See application file for complete search history.

(56) References Cited

U.S. PATENT DOCUMENTS

| 7,664,819 B2 | 2/2010 | Murphy et al. |
| 7,899,866 B1 | 3/2011 | Buckingham et al. |

(Continued)

FOREIGN PATENT DOCUMENTS

| EP | 2665230 A1 | 11/2013 |
| WO | WO 03/105008 A1 | 12/2003 |

OTHER PUBLICATIONS

Awad, W. A. et al., "Machine Learning Methods for Spam E-mail Classification", International Journal of Computer Science & Information Technology (ITCSIT), http://airccse.org/journal/jcsit/0211ijcsit12.pdf, vol. 3, No. 1, Feb. 2011, pp. 173-184.

(Continued)

*Primary Examiner* — Irete F Ehichioya
*Assistant Examiner* — Xiaoqin Hu
(74) *Attorney, Agent, or Firm* — Francis Lammes; Stephen J. Walder, Jr.; William H. Hartwell

(57) ABSTRACT

A mechanism is provided for updating a knowledge base of a spam detection system for email messages. A first and a second email set of email messages related to a time window are created. The first email set comprises email messages currently classified as spam messages, the second email set email messages currently classified as non-spam messages. A natural language term that is not present in the knowledge base is extracted from one of the email messages contained in one of the two email sets. Based on a frequency of occurrence of the extracted term in email messages contained in one or more of the two email sets and based on whether the respective email messages are spam messages or non-spam messages, a score value of the extracted term is calculated. The extracted term and the calculated score value are stored into the knowledge base.

18 Claims, 5 Drawing Sheets

(51) Int. Cl.
*G06F 17/10* (2006.01)
*H04L 12/58* (2006.01)
*G06F 16/242* (2019.01)
*G06F 21/55* (2013.01)
*G06F 17/27* (2006.01)

(52) U.S. Cl.
CPC ........ *G06F 17/2765* (2013.01); *G06F 21/552* (2013.01); *H04L 51/12* (2013.01); *H04L 51/30* (2013.01)

(56) References Cited

U.S. PATENT DOCUMENTS

| 8,515,894 | B2 | 8/2013 | Yu | |
|---|---|---|---|---|
| 9,123,046 | B1* | 9/2015 | Yuksel | G06Q 30/018 |
| 2005/0080860 | A1* | 4/2005 | Daniell | G06Q 10/107 |
| | | | | 709/206 |
| 2006/0149821 | A1* | 7/2006 | Rajan | G06Q 10/107 |
| | | | | 709/206 |
| 2010/0145900 | A1* | 6/2010 | Zheng | G06N 7/005 |
| | | | | 706/52 |
| 2017/0005962 | A1 | 1/2017 | Lewin-Eytan et al. | |
| 2017/0034089 | A1 | 2/2017 | Ludwig et al. | |
| 2017/0041335 | A1 | 2/2017 | Spiro et al. | |
| 2017/0070461 | A1 | 3/2017 | Bandini et al. | |
| 2018/0278627 | A1* | 9/2018 | Goutal | H04L 63/1416 |

OTHER PUBLICATIONS

Ezpeleta, Enaitz et al., "Does sentiment analysis help in bayesian spam filtering?", Springer, Cham, International Conference on Hybrid Artificial Intelligence Systems, Apr. 18, 2016, 23 pages.
Yunos, Fauzi, "Spam and Ham: A Simple Guide", Open Kod Sdn. Bhd, http://www.openkod.com/wp-content/uploads/2015/06/Anti-spam.pdf, Whitepaper, 2015, 8 pages.

* cited by examiner

UPDATING A KNOWLEDGE BASE OF A SPAM DETECTION SYSTEM

BACKGROUND

The present invention relates to the field of digital computer systems, and more specifically, to a method for updating a knowledge base of a spam detection system.

Spam detection systems use the spam filters to identify whether an email message is a spam message, i.e. a junk mail, or a non-spam message, i.e. a legal mail relevant for the user. Non-spam messages are sometimes also referred to as ham messages. These filters may take into account several parameters of an incoming email message in order to classify the same as spam or non-spam.

The spam filters must be kept up to date, since spammers continuously learn and improve their tactics in order to get around the filters, e.g. by avoiding characteristics of their email messages which may trigger a classification as spam. Moreover, what a user may consider as an unsolicited message, i.e. spam, may change with time, such that email messages consider as spam at one given point in time may be considered as non-spam at another point in time and vice versa.

Thus, technical issues arise when trying to implement a spam detection system such that it continuously identifies and sorts out spam messages in a reliable and accurate way.

SUMMARY

Various embodiments provide a computer implemented method for updating a knowledge base of a spam detection system, a computer system and a computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for updating a knowledge base of a spam detection system for email messages. The knowledge base is operable for storing natural language terms. The knowledge base is operable for storing for each of the stored natural language terms a score value related to the respective term. The score value specifies whether the respective term is indicative for a spam message or a non-spam message.

The method comprises the following: A first email set of email messages related to a time window is created. The first email set comprises email messages currently classified as spam messages. A second email set of email messages related to the time window is created. The second email set comprises email messages currently classified as non-spam messages. A natural language term is extracted that is not present in the knowledge base from one of the email messages contained in one of the two email sets. Based on a frequency of occurrence of the extracted term in email messages contained in one or more of the two email sets and based on whether the respective email messages comprising the extracted term are spam messages or non-spam messages, a score value of the extracted term is calculated. The extracted term and the calculated score value are stored into the knowledge base.

In another aspect, the invention relates to a computer program product comprising a non-volatile computer-readable storage medium. The storage medium has computer-readable program code embodied therewith. The computer-readable program code is configured for updating a knowledge base of a spam detection system for email messages, when it is executed by a computer system. The knowledge base is operable for storing natural language terms. The knowledge base is further operable for storing for each of the stored natural language terms a score value related to the respective term. The score value specifies whether the respective term is indicative for a spam message or a non-spam message.

The updating of the knowledge base comprises the following: A first email set of email messages related to a time window is created. The first email set comprises email messages currently classified as spam messages. A second email set of email messages related to the time window is created. The second email set comprises email messages currently classified as non-spam messages. A natural language term is extracted that is not present in the knowledge base from one of the email messages contained in one of the two email sets. Based on a frequency of occurrence of the extracted term in email messages contained in one or more of the two email sets and based on whether the respective email messages comprising the extracted term are spam messages or non-spam messages, a score value of the extracted term is calculated. The extracted term and the calculated score value are stored into the knowledge base.

In another aspect, the invention relates to a computer system for updating a knowledge base of a spam detection system for email messages. The knowledge base is operable for storing natural language terms. The knowledge base is further operable for storing for each of the stored natural language terms a score value related to the respective term. The score value specifies whether the respective term is indicative for a spam message or a non-spam message.

The computer system is configured for executing the following, in order to update the knowledge base: A first email set of email messages related to a time window is created. The first email set comprises email messages currently classified as spam messages. A second email set of email messages related to the time window is created. The second email set comprises email messages currently classified as non-spam messages. A natural language term is extracted that is not present in the knowledge base from one of the email messages contained in one of the two email sets. Based on a frequency of occurrence of the extracted term in email messages contained in one or more of the two email sets and based on whether the respective email messages comprising the extracted term are spam messages or non-spam messages, a score value of the extracted term is calculated. The extracted term and the calculated score value are stored into the knowledge base.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
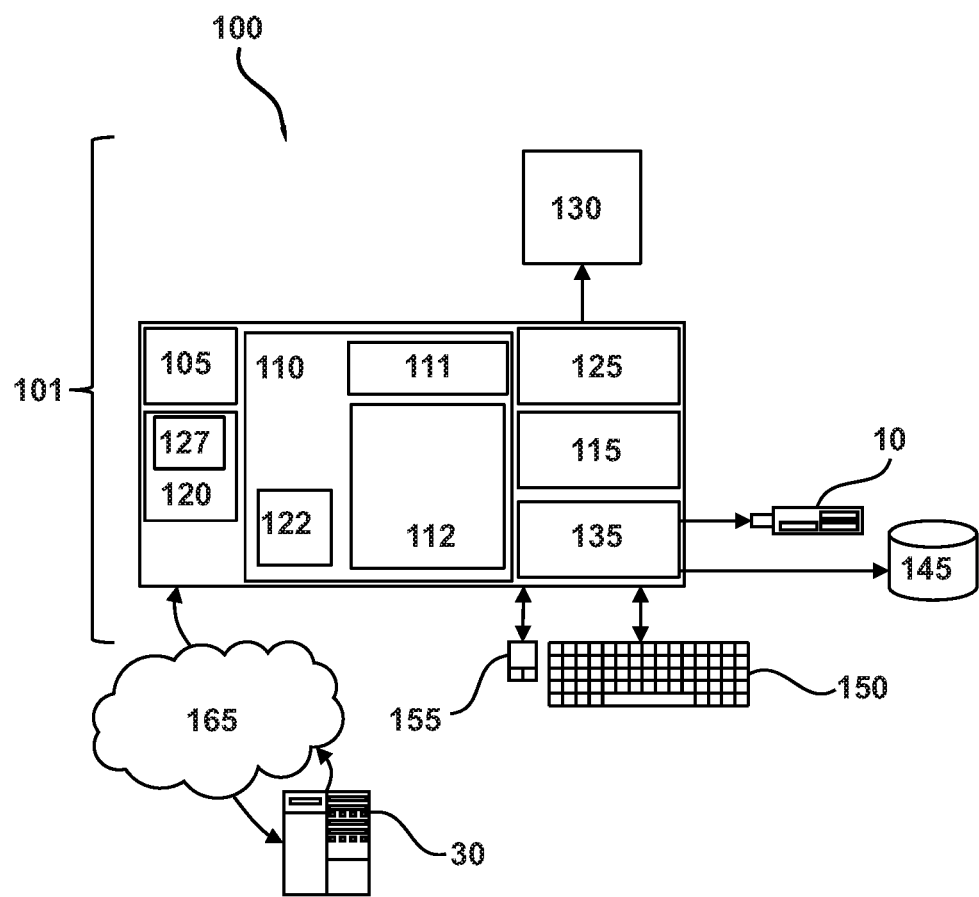
FIG. 1 represents a computerized system, suited for implementing one or more method steps as involved in the present disclosure.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Spam emails, also known as junk emails, refer to a type of electronic spam where unsolicited messages are sent by email. Email spam messages may for example be commercial in nature. They may also contain disguised links that may appear to be for familiar websites but in fact lead to phishing web sites or sites that are hosting malware. Spam emails may also include malware as scripts or other executable file attachments.

Spam detection refers to a detection of email messages, in order in order to determine whether the respective emails are spam messages or non-spam messages. In other words, spam detection aims to detect spam messages. The analysis may take into account several parameters of the email messages, like e.g. specific terms (or n-grams) contained in the message, the sender of the email, the subject of the email etc.

Spam detection may comprise the use of natural language processing, text analysis and computational linguistics to identify and extract subjective information in source data. For example, a spam detection systems may use different approaches such as NLP-based method that analyzes the language using natural language processing tools, statistical machine learning-based method that uses classifiers (e.g. Bayes classifiers); or lexicon based method that uses a lexicon of spam terms. A text analytics machine learning algorithm may be used to discover whether an email is a spam or non-spam message.

A knowledge base refers to a set of data storing complex structured and unstructured information used by a computer system. A knowledge base of a spam detection system may comprise information about terms that are indicative for spam and/or non-spam messages. These terms may be used to classify an email as spam or non-spam. Spam detection may thus involves identifying each term appearing in the messages and assigning a score to the term, which can e.g. be a negative score or positive score to express whether the term is associated with spam or non-spam.

A 'term' refers to a word or a combination of words. For example, a term may be a noun or compound noun. As other examples, a term can be any other word or combination of words, where the word(s) can be a noun, a compound noun, an adjective, a verb, and so forth.

Embodiments may have the beneficial effect to enable an automated identification of new terms, i.e. terms not present in the knowledge base that may be or may become indicative for spam messages or non-spam messages, a continuous detection of the same and an automated updating of the knowledge base accordingly. By regularly updating the knowledge base, the present method may enable an efficient identification of spam messages.

The present method may take into account the aspect related to the trained knowledge base which is the vertiginous evolution of the spoken languages used in messages like emails, which makes it difficult to keep it up to date for mining new idioms, neologisms, abbreviations, acronyms etc.

A reliable and accurate spam detection system may require to be kept up to date and learn continuously which terms may currently be indicative for spam or non-spam messages. In order to get around spam detection systems, spammers may use new terms. Moreover, what a user may consider as spam may change with time. For example, emails from a motor company may e.g. be considered as spam and put into a spam folder, in particular in case the user does not own car from that specific company. Such spam messages may be detected based on the sender of the email, i.e. by blacklisting the respective company. However, if the user buys a car from that specific company, not all of the emails from the respective company may be spam messages anymore, i.e. there may be some emails interesting to the user. Thus, the user needs to move the interesting emails out from the spam folder into the inbox of an email client. Such a re-classification by the user may be ok for a first few email, but later on the spam detection system should be able to discriminate automatically between spam and non-spam messages received from that motor company. Such content depending spam detection may be performed based on an analysis of the terms contained by the email messages received. A spam detection system with a knowledge base which is updated continuously may prevent the necessity to define ad-hoc a spam filter for detecting spam messages.

The present method may keep up to date the knowledge base, e.g. of a 'lexicon based spam detection system' by automatically identifying new terms and/or removing terms not used anymore. Furthermore, terms may be removed which are not considered to be indicative for spam messages or non-spam messages anymore.

For example, the method (e.g. the deciding, extracting, calculating and storing steps) may be performed for each message of the received messages. In another example, the method may be performed on a predefined part of the received messages. For example, only messages that originated from a given location and/or at a given time period may be processed by the present method. In another example, only messages of a specific language may be processed. This selective processing of messages may be advantageous as it may for example avoid processing redundant messages (e.g. messages that are regularly submitted) or processing irrelevant messages.

The messages may for example be received at a predefined time period. Upon performing the present method on each of the received messages, other messages may be received in another time period and may be processed using the present method.

Having an overview of the new terms that can be added to the knowledge base may enable an improved control of storage of the new terms in the knowledge base. For example, storing on a term by term basis in the knowledge base may require evaluating the storage status before storing each term while in the present case the same evaluation may be done at once using the set of candidates.

According to embodiments, the method comprises storing the extracted term in a first candidate set of candidate terms potentially indicative for spam messages if the frequency of occurrence of the term in the email messages of the first set is greater than or equal to a first threshold. According to embodiments, the method comprises storing the term in a second candidate set of candidate terms potentially indicative for non-spam messages if the frequency of occurrence of the term in email messages of the second set is greater than or equal to a second threshold. Embodiments may have the beneficial effect that candidate terms potentially indicative for spam messages as well as candidate terms potentially indicative for non-spam messages terms are collected. By this preselection based on the first and second threshold, the workload for the further processing of candidate terms may be reduced. According to embodiments, the first and the second threshold may be equal. According to further embodiments, the first and the second threshold may be different. Depending on whether the first or the second threshold is greater, the reliability of spam or non-spam classifications may be increased relative.

According to embodiments, the method comprises calculating a first set difference of the first candidate set and the second candidate set in order to obtain a first supplement set of terms indicative for spam messages to be added to the knowledge base. According to embodiments, the method comprises calculating a second set difference of the second candidate set and the first candidate set in order to obtain a second supplement set of terms indicative for non-spam messages to be added to the knowledge base. Embodiments may have the beneficial effect that candidate terms which are not unambiguously indicative for spam or non-spam messages are sorted out.

In this way, the spam terms candidates that are also present with a high frequency in non-spam messages are eliminated, since such terms may introduce ambiguity as they cannot be considered as identifiers of spam or non-spam messages.

According to embodiments, the frequency of occurrence is the fraction of email messages comprising the extracted term of the email set that contains the email message from which the respective term is extracted.

According to embodiments, the method further comprises for each of the email sets the following, one or more terms in one or more of the email message of the respective email set are identified. A vocabulary comprising the identified terms is created, where each identified term is tagged as a new term, as an existing spam term or as an existing non-spam term in the knowledge base. Furthermore, the extracting the term comprises selecting a term of the vocabulary being tagged as a new term. Embodiments may have the beneficial effect that, based on the vocabulary terms, each term comprised by the email messages may be identified as spam or non-spam terms. In case a term is neither a spam nor a non-spam term, the same may be identified as a new term not assigned to spam or non-spam messages yet.

Having both the existing terms as well as the new terms in a vocabulary may enable an accurate scoring of the terms as described with the following embodiment. For example, if there are too many new terms compared to the existing terms, this may be an indication that the new terms may comprise fake spam or fake non-spam terms and may thus be scored accordingly.

According to embodiments, one or more terms are identified in each email message of the respective email set. Embodiments may have the beneficial effect that spam and/or non-spam terms may be identified in each message such that each massage can be classified as a spam or a non-spam message based on its content, i.e. based on the terms comprised by the respective email message.

According to embodiments, the score value of the extracted term is calculated taking into account one or more of the following: whether the email message from which the respective term is extracted has been moved to the email set which comprises the respective email message due to a user move command, whether the sender of the email message from which the respective term is extracted is blacklisted, and whether the sender of the email message from which the respective term is extracted is whitelisted.

Embodiments may have the beneficial effect that the spam detection system is enabled to learn continuously from the user behavior taking into account re-classifications, i.e. the moving of emails, by the user. Furthermore, email messages from blacklisted or whitelisted senders may be classified as spam or non-spam message with a high level of reliability. Otherwise, there may always remain a non-vanishing possibility that a message is erroneously considered to a spam or a non-spam email even though the opposite may be true. Such an error may result in an incorrect basic assumption which may possibly spoil the whole classification of knew terms.

According to embodiments, the score value score(c_spam_term) of the extracted term stored in the first candidate set is defined using the following formula:

$$score(c\_spam\_term) = freq(c\_spam\_term) * \frac{1}{N} \sum_{i=1}^{N} [freq(spam\_term_i) * score(spam\_term_i)].$$

The score value score(c_spam_term) of the candidate spam term c_spam_term is calculated using its frequency of occurrence of c_spam_term in the spam messages of the first email set multiplied by the weighted sum of the score values of known spam terms spam_term$_i$ that are comprised by the spam messages of the first email set.

According to embodiments, the score value score(c_spam_term) of the extracted term stored in the first candidate set is defined using the following formula:

$$score(c\_spam\_term) = freq(c\_spam\_term) * \frac{1}{N} \sum_{i=1}^{N} [freq(spam\_term_i) * score(spam\_term_i)] *$$
$$[1 + a1 * freq\_moved\_to\_spam(c\_spam\_term) +$$
$$b1 * freq\_blacklisted(c\_spam\_term)].$$

The term freq(c_spam_term) identifies the frequency of occurrence of the extracted term in the first email set. N is the number of terms comprised by the email messages of the first email set which are tagged in the vocabulary as existing spam terms. The sum from i=1 to N is the sum over the N terms tagged in the vocabulary as existing spam terms. The term freq(spam_term$_i$) identifies the frequency of the ith term tagged as an existing spam_term in the first email set. The term score(spam_term$_i$) identifies the score value of the ith term tagged in the vocabulary as an existing spam term. The factors a1 and b1 are positive weighting factors. The term freq_moved_to_spam(c_spam_term) identifies the frequency of occurrence of the extracted term in a first subset of the first email set comprising email messages which have been moved to the first email set due to a user move command. Furthermore, the term freq_blacklisted (c_spam_term) identifies the frequency of occurrence of the extracted term in a second subset of the first email set comprising email messages which have been moved to the first email set due to having a sender which is blacklisted.

This formula may be used for calculating the score of a new spam or non-spam term. The score is provided as proportional to the frequency of the term because the higher is the frequency; the higher is the confidence that a new spam (or non-spam) term is detected. This embodiment may further comprise calculating an average (e.g. a weighted average) of the scores of the existing terms (N terms of the first email set/second email set/vocabulary) that determined the identification of the new term for a similarity reason. Based on the comparison between the score of the term with the calculated average, the term may be stored in the knowledge based e.g. if the score is higher or equal to the calculated average the term may be stored in the knowledge base. In other terms, the score of the new term should be similar to the score of the ones that determined it.

Embodiments may have the beneficial effect providing a more accurate score value by taking into account the frequency of occurrence of the candidate spam term in email messages moved to the first email set due to a user move command. Furthermore, the frequency of occurrence of the candidate spam term in email messages moved to the first email set due to having a sender which is blacklisted is taken into account. The score value of the candidate spam term is boosted proportional to these two frequencies. According to embodiments, a1 and b1 may be equal, i.e. a1=b1. According to further embodiments, the frequency term freq_moved_to_spam(c_spam_term) may be boosted more, i.e. a1>b1, since it is related to an explicit user action. It is the user that decides to move an email originally classified as a non-spam email message by the system into the spam folder, i.e. to re-classify it as a spam message.

According to embodiments, the score value score(c_non-spam_term) of the extracted term stored in the second candidate set is defined using the following formula:

$$\text{score}(c\_non\text{-}spam\_term) = freq(c\_non\text{-}spam\_term) * \frac{1}{M} \sum_{i=1}^{M} [freq(non\text{-}spam\_term_i) * \text{score}(non\text{-}spam\_term_i)].$$

The score value score(c_non-spam_term) of the candidate non-spam_term c_non-spam_term is calculated using its frequency of occurrence of c_non-spam_term in the non-spam messages of the second email set multiplied by the weighted sum of the score values of known non-spam terms non-spam_term$_i$ that are comprised by the non-spam messages of the second email set.

According to embodiments, the score value score(c_non-spam_term) of the extracted term stored in the second candidate set is defined using the following formula:

$$\text{score}(c\_non\text{-}spam\_term) = freq(c\_non\text{-}spam\_term) *$$
$$\frac{1}{M} \sum_{i=1}^{M} [freq(non\text{-}spam\_term_i) * \text{score}(non\text{-}spam\_term_i)] *$$
$$[1 + a2 * freq\_moved\_to\_non\text{-}spam(c\_non\text{-}spam\_term) +$$
$$b2 * freq\_whitelisted(c\_non\text{-}spam\_term)].$$

The term freq(c_non-spam_term) is the frequency of occurrence of the extracted term in the second email set. M is the number of terms in the comprised by the email messages of the second set which are tagged in the vocabulary as existing non-spam terms. The sum from i=1 to M is the sum over the M terms tagged in the vocabulary as existing non-spam terms. The term freq(non-spam_term$_i$) identifies the frequency of the ith term tagged as an existing non-spam term in the second email set. The term score(non-spam_term$_i$) identifies the score value of the ith term tagged in the vocabulary as an existing non-spam term. The factors a2 and b2 are positive weighting factors. The term freq_moved_to_non-spam(c_non-spam_term) identifies the frequency of occurrence of the extracted term in a second subset of the second email set comprising email messages which have been moved to the second email set due to a user move command. The term freq_whiteisted(c_non-spam_term) identifies the frequency of occurrence of the extracted term in a second subset of the second email set comprising email messages which have been moved to the second email set due to having a sender which is whitelisted.

Embodiments may have the beneficial effect providing a more accurate score value by taking into account the frequency of occurrence of the candidate non-spam term in email messages moved to the second email set due to a user move command. Furthermore, the frequency of occurrence of the candidate non-spam term in email messages moved to the first email set due to having a sender which is whitelisted is taken into account. The score value of the candidate non-spam term is boosted proportional to these two frequencies. According to embodiments, a2 and b2 may be equal, i.e. a2=b2. According to further embodiments, the frequency term freq_moved_to_non-spam(c_non-spam_term) may be boosted more, i.e. a2>b2, since it is related to an explicit user action. It is the user that decides to move an email originally classified as a spam email message by the system into a non-spam folder, i.e. to re-classify it as a non-spam message.

According to embodiments, in case one or more email messages are moved to one of the email sets due to a user move command, the score values of one or more of spam or non-spam terms comprised by the one or more email messages are updated taking into account that the respective email message has been moved due to a user move command.

According to embodiments, in case one or more email messages are moved to the first email set due to a user move command and form a first subset of the first email set, the score values score(spam_term) of spam terms which are comprised by the moved email messages and which are tagged in the vocabulary as existing spam terms are each increased:

$$\text{score}(spam\_term) = \text{score}(spam\_term) * [1 + a4 * freq\_moved\_to\_spam(spam\_term)].$$

The term freq_moved_to_spam(spam_term) identifies the frequency of occurrence of the respective spam term in the first subset, while a4 is a positive weighting factor.

Embodiments may have the beneficial effect that by re-evaluating, i.e. updating, the score values score (spam_term) of spam terms which are comprised by email messages moved to the spam folder due to a user command, more accurate score values may be provided. If many emails containing the respective spam term were moved by the user into the spam folder, i.e. re-classified as spam messages, the system may have originally misclassified the respective emails. Thus, increasing the score of the spam terms in these emails may improve the system. According to embodiments, the score value is not amended depending on the frequency of occurrence of the respective spam term in email messages from a blacklisted sender, because the moving of email messages due to a backlisted sender is not related to any error of the system. This type of movement is rather part of a correctly operating spam detection system.

According to embodiments, the score values score(non-spam_term) of non-spam terms which are comprised by the moved email messages and which are tagged in the vocabulary as existing non-spam terms are each decreased:

$$\text{score(non-spam\_term)} = \text{score(non-spam\_term)} * [1 - a5 * \text{freq\_moved\_to\_spam(non-spam\_term)}].$$

The term freq_moved_to_spam(non-spam_term) identifies the frequency of occurrence of the respective non-spam term in the first subset, while a5 is a positive weighting factor.

Embodiments may have the beneficial effect that by re-evaluating, i.e. updating, the score values score(non-spam_term) of non-spam terms which are comprised by email messages moved to the spam folder due to a user command, more accurate score values may be provided. If many emails containing the respective non-spam term were moved by the user into the spam folder, i.e. re-classified as spam messages, the system may have originally misclassified the respective emails. Thus, decreasing the score of the non-spam terms in these emails may improve the system. According to embodiments, the score value is not amended depending on the frequency of occurrence of the respective non-spam term in email messages from a blacklisted sender, because the moving of email messages due to a backlisted sender is not related to any error of the system. This type of movement is rather part of a correctly operating spam detection system.

According to embodiments, in case one or more email messages are moved to the second email set due to a user move command and form a second subset of the second email set, the score values score(non-spam term) of non-spam terms which are comprised by the moved email messages and which are tagged in the vocabulary as existing non-spam terms are each increased:

$$\text{score(non-spam\_term)} = \text{score(non-spam\_term)} * [1 + a6 * \text{freq\_moved\_to\_non-spam(non-spam\_term)}].$$

The term freq_moved_to_non-spam(non-spam_term) identifies the frequency of occurrence of the respective non-spam term in the second subset, while a6 is a positive weighting factor.

Embodiments may have the beneficial effect that by re-evaluating, i.e. updating, the score values score(non-spam_term) of non-spam terms which are comprised by email messages moved to a non-spam folder due to a user command, more accurate score values may be provided. If many emails containing the respective spam term were moved by the user into a non-spam folder, i.e. re-classified as non-spam messages, the system may have originally misclassified the respective emails. Thus, increasing the score of the non-spam terms in these emails may improve the system. According to embodiments, the score value is not amended depending on the frequency of occurrence of the respective non-spam term in email messages from a whitelisted sender, because the moving of email messages due to a whitelisted sender is not related to any error of the system. This type of movement is rather part of a correctly operating spam detection system.

According to embodiments, the score values score(spam_term) of spam terms which are comprised by the moved email messages and which are tagged in the vocabulary as existing spam terms are each decreased:

$$\text{score(spam\_term)} = \text{score(spam\_term)} * [1 - a7 * \text{freq\_moved\_to\_non-spam(spam\_term)}].$$

The term freq_moved_to_non-spam(spam_term) identifies the frequency of occurrence of the respective spam term in the second subset, while a7 is a positive weighting factor.

Embodiments may have the beneficial effect that by re-evaluating, i.e. updating, the score values score(spam_term) of spam terms which are comprised by email messages moved to a non-spam folder due to a user command, more accurate score values may be provided. If many emails containing the respective spam term were moved by the user into a non-spam folder, i.e. re-classified as non-spam messages, the system may have originally misclassified the respective emails. Thus, decreasing the score of the spam terms in these emails may improve the system. According to embodiments, the score value is not amended depending on the frequency of occurrence of the respective spam term in email messages from a whitelisted sender, because the moving of email messages due to a whitelisted sender is not related to any error of the system. This type of movement is rather part of a correctly operating spam detection system.

According to embodiments, the method further comprises the following: Within the time window multiple email messages to be added to the email sets in order to update the email sets are received. Each of the received email messages is classified either as a spam message or as a non-spam message. Based on the classification the respective email message is added to one of the email sets. Email messages from senders which are blacklisted are classified as spam message. Email messages from senders which are whitelisted are classified as non-spam message. Email messages from senders, which are neither blacklisted nor whitelisted, are classified as spam or non-spam message depending on their content.

According to embodiments, the method further comprises updating the time window and removing from the email sets email messages related to a time outside of the updated time window. Embodiments may have the beneficial effect that time window may for example a most recent time window, like e.g. the last 10 days or four weeks. The time window may be updated periodically, like e.g. daily, every second day or weekly. Thus, it may be ensured that the time window used is kept up to date. Email messages related to the time window may e.g. be messages receipt during that time window and/or messages moved to one of the email sets during that time window. According to embodiments, each email message, which has been received during the updated time window and which is not part of one of the email sets yet, is added to the first or second email set depending on whether the respective message is a spam or a non-spam message.

According to embodiments, the method comprises: The frequency of occurrence of one or more terms, which are present in the knowledge base, is monitored in one of the email sets. The score value of the respective term is updated or removed from the knowledge base based on the monitoring. Embodiments may have the beneficial effect that the knowledge base is kept up to date. Not only new terms are added to the knowledge base, but also the score values of existing terms updated.

The frequency of occurrence of the term that is present in the knowledge base may be determined for a predefined time period. For example, during that time period, it may be determined how often that term of the knowledge base has been used in the received email messages.

FIG. 1 represents a general computerized system being a spam analysis and detection system 100, suited for implementing method steps as involved in the disclosure.

It will be appreciated that the methods described herein are at least partly non-interactive and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The spam analysis and detection system 100 therefore includes a general-purpose computer 101.

In exemplary embodiments, in terms of hardware architecture, as shown in FIG. 1, the general-purpose computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the general-purpose computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions or software 112 e.g. instructions to manage databases such as a database management system.

The software in the memory 110 shall also typically include a suitable operating system (OS) 111. The OS 111 essentially controls the execution of other computer programs, such as possibly software 112 for implementing methods as described herein.

The methods described herein may be in the form of a source program, executable program (object code), script, or any other entity comprising a set of instructions to be performed. The software 112 may e.g. implement an email client and/or SMTP settings. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 10, 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The spam analysis and detection system 100 can further include a display controller 125 coupled to a display 130. In exemplary embodiments, the spam analysis and detection system 100 can further include a network interface for coupling to a network 165. The network 165 can be an IP-based network for communication between the general-purpose computer 101 and any external server, client and the like via a broadband connection. The network 165 transmits and receives data between the general-purpose computer 101 and external systems 30, which can be involved to perform part or all of the steps of the methods discussed herein. In exemplary embodiments, the network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals. The general-purpose computer 101 may receive email messages via the network 165 e.g. from an email server such as external system 30.

If the general-purpose computer 101 is a PC, workstation, intelligent device or the like, the software in the memory 110 may further include firmware 122, such as a basic input output system (BIOS). The BIOS is a set of essential software routines that initialize and test hardware at startup, start the OS 111, and support the transfer of data among the hardware devices. The BIOS is stored in ROM so that the BIOS can be executed when the computer 101 is activated.

When the general-purpose computer 101 is in operation, the processor 105 is configured to execute software 112 stored within the memory 110, to communicate data to and from the memory 110, and to generally control operations of the general-purpose computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 may comprise a knowledge base 127. Although the knowledge base 127 is shown as part of the storage 120, the knowledge base 127 may be stored in other storages that that can be accessed by the general-purpose computer 101. For example, the knowledge base 127 may be stored on the external systems 30 or I/O devices 10, 145.

The knowledge base 127 may for example comprise a table that includes records 137A-N. The knowledge base 127 includes fields or columns 131A for terms (e.g. natural language terms), fields or columns 131B for frequency of occurrence of the terms, fields or columns 131C for score associated with the terms. The terms may be spam or non-spam terms. According to alternative embodiments, two knowledge bases 127 may e.g. be provided a first knowledge base comprising spam terms as well as score values of the respective spam terms and a second knowledge base comprising non-spam terms as well as score values of the respective non-spam terms.

The format of the knowledge base 127 is shown as an example; however, other formats for containing the information of the knowledge base may be used such as JSON like format, No-SQL database, XML format, data format based on a Prolog language etc. The knowledge base 127 may be in a format that enables access the terms stored in the knowledge base 127.

Field 131A may comprise spam or non-spam terms. A term of the field 131A can be a single word or an idiomatic expression, or in general an n-gram. Field 131B may comprise frequency values indicating the frequency of occurrence of a term. The frequency of occurrence of a term may for example be the number of messages in one of the email sets, i.e. the email set comprising spam messages in case of a spam term or the email set comprising non-spam messages in case of a non-spam term, which contain the respective term divided by the number of messages in the respective email set. Field 131C may comprise score values. The score values may be positive numbers or negative numbers, where positive e.g. means the term is a non-spam term and negative means the term is a spam term or vice versa. Thus, each record 137A-N includes values indicating at least a given term and a score value. In addition, the frequency of occurrence of each term may be indicated. While the knowledge base 127 is shown containing attributes or fields 131B-C for each term in field 131A, more or less fields may be used in the knowledge base 127 in association with each term in field 131A. According to embodiments, an additional indicator may be assigned to each term or score value indicating whether the respective term is a spam or a non-spam term. According to embodiments, the knowledge base 127 may only comprise the terms in field 131A and the score values in field 131C.

Figure 2:
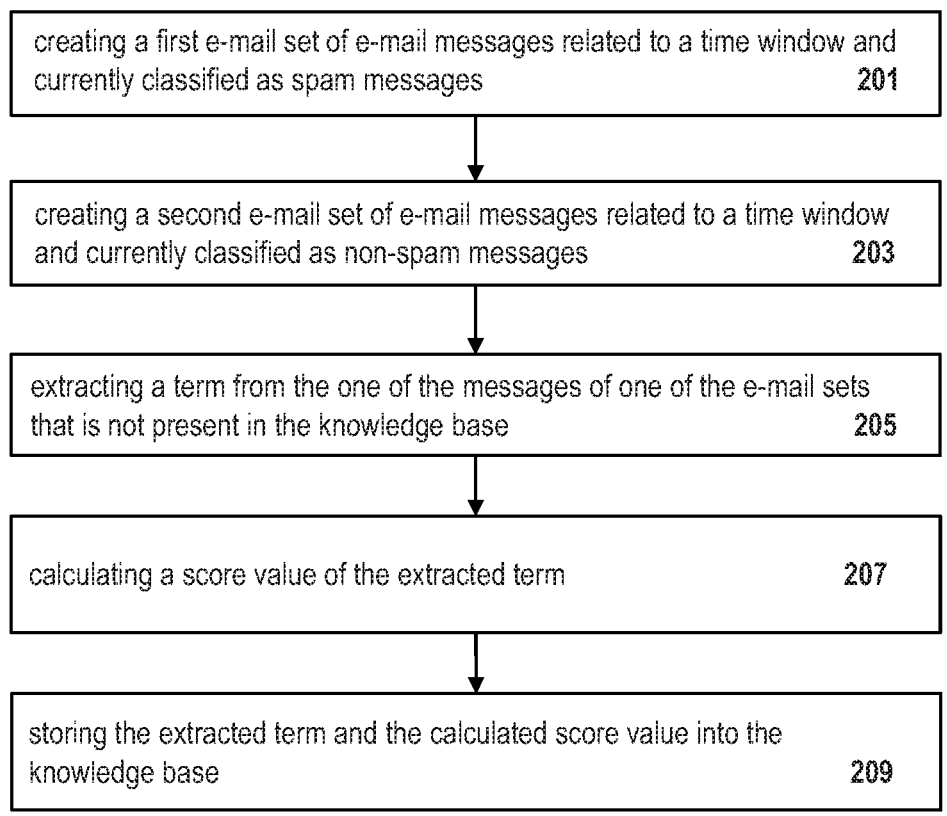
FIG. 2 is a flowchart of an example method for updating a knowledge base of a spam analysis and detection system.

FIG. 2 is a flowchart of an example method for updating a knowledge base 127 of a spam analysis and detection system 100. The method may have as input multiple email messages received and classified as spam or non-spam messages by the spam analysis and detection system 100 through a predefined time window. The messages may for example be processed at real-time while the email messages are received.

In another example, the input email messages may be present in a database and the method may comprise querying the database for accessing the input messages to perform the steps 201-209. The database may for each email messages in addition indicate whether the respective email is classified as a spam or as a non-spam message.

Each email message of the input messages may be time stamped, wherein the timestamp may indicate the time at which the message is received.

In step 201, a first email set of email messages related to a time window is created. The first email set comprises email messages currently classified as spam messages. In step 203, a second email set of email messages related to the time window is created. The second email set comprises email messages currently classified as non-spam messages. The time window may be, for example, a most recent time window and the relation may e.g. be established by a time of receive or a time of classification the respective spam messages within the respective time window. The classification may for example be performed using the knowledge base 127, a blacklist of spammers, and/or a whitelist of non-spammers.

For classifying a received email message as spam or non-spam, the terms that are included in the revived message and that are stored in the knowledge base 127 may be used. The scores of those terms may be used to define whether the given message is a spam or a non-spam message. For example, the score values of the terms of the knowledge base that are part of the received message may be summed up and averaged such that to determine if the given message is a spam or a non-spam message based on the resulting sum. The sum of the score values may be an algebraic sum, with the score values having a sign + or − depending on the polarity of the term. In another example, the number of spam terms of the given message may be compared with the number of non-spam terms in the given message and based on the comparison result the given message may be classified as spam or non-spam e.g. if the number of spam (non-spam) terms is higher than the number of non-spam (spam) terms the message may be classified as a spam (non-spam) message.

Steps 205-209 may be performed for each message of the emails sets and each term of each message that is not present in the knowledge base 127.

In step 205, a term is extracted that is not present in the knowledge base from one of the email messages contained in one of the two email sets. The respective message may be processed using a natural language parsing tool in order to identify terms of the message. The terms identified in the message may for example be filtered such that only those terms that are language entities such as nouns, locations, dates, etc. can be processed by the present method.

For example, each term identified in the message may be compared with the terms of the knowledge base 127 and if the identified term is not present in the knowledge base 127, the identified term may be extracted from the message. The extracting of the term from the message may comprise reading the term. The reading of the term may for example be performed from the storage (e.g. a main memory) where the message is stored.

Before extracting the term from the message, the method may comprise performing a lowercase transformation of the words in the message, removing stop-words in the message and/or stemming the words of the message.

In step 207, a score value may be calculated for the extracted term based on a frequency of occurrence of the extracted term in email messages contained in the two email sets created in steps 201 and 203 as well as based on whether the respective email messages comprising the extracted term are spam messages or non-spam messages. The score value may indicate that the extracted term is a spam or non-spam term, e.g. by negative or positive sings or by any other type of indicator.

For example, the frequency of occurrence of the term may be the number of occurrence of the term in the messages of the email set with the message from which the term is extracted divided by the number of messages of that email set. If the term appears more than once in a single message it may be counted as occurred only once in that single message. The frequency of occurrence of the term is the number of messages in a set containing the term divided by the total number of messages in the set. In another example, the frequency of occurrence of the term may be the number of occurrence of the term in all the email messages divided by the number of all email messages.

In step 209, the term and the calculated score value may be stored into the knowledge base 127. For example, the term maybe stored only if the frequency of the term is higher than a predefined threshold.

Figure 3:
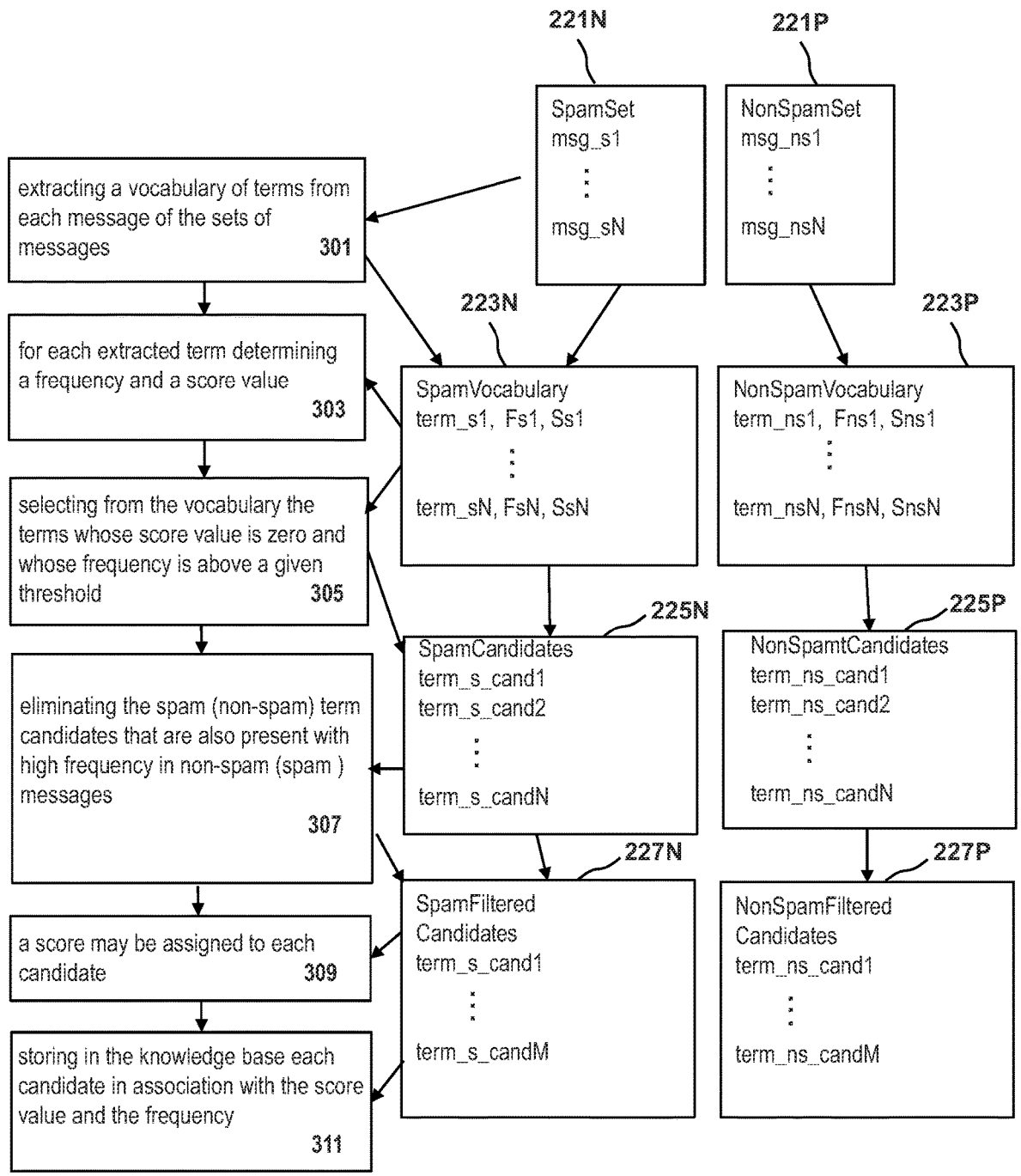
FIG. 3 is a flowchart of another example method for updating the knowledge base of the spam analysis and detection system.

FIG. 3 is a flowchart of another example method for updating the knowledge base 127 of a spam analysis and detection system 100. For example, two sets of classified email messages may be generated from folders comprising email messages classified as spam or non-spam and being related to a predefined time window: a non-spam (NonSpamSet) 221P and a spam (SpamSet) 221N set of messages. The classification into spam and non-spam message may be performed as described above. As shown in FIG. 3, NonSpamSet 221P may comprise non-spam messages msg_ns1-msg_nsN and SpamSet 221N may comprise spam messages msg_s1-msg_sN. The number of messages in each of NonSpamSet 221P and SpamSet 221N may or may not be the same.

For each set of the sets NonSpamSet 221P and SpamSet 221N, steps 301-311 may be performed. For clarity of the description, in each of the following steps, both NonSpamSet 221P and SpamSet 221N are described; however, this does not mean that the two sets NonSpamSet 221P and SpamSet 221N have to be processed together (e.g. in parallel) in each step. For example, steps 301-305 may be processed on the NonSpamSet 221P and SpamSet 221N in parallel. In another example, steps 301-305 may be processed on the NonSpamSet 221P first and then processed for the SpamSet 221N or vice versa. For example, steps 307-311 may be processed on the NonSpamSet 221P and SpamSet 221N in parallel. In another example, steps 307-311 may be processed on the NonSpamSet 221P first and then processed for the SpamSet 221N or vice versa.

In step 301, a vocabulary SpamSetVocabulary 223N of potential spam terms (term_s1-term_sN) may be extracted from each email message of the set SpamSet 221N. The terms may be extracted after performing a lowercase transformation of the words, removing stop-words and/or stemming the words of each message of the set SpamSet 221N. For the set NonSpamSet 221P a vocabulary NonSpamSetVocabulary 223P of potential non-spam terms (term_ns1-term_nsN) may be extracted from each message of the set NonSpamSet 221P. The terms may be extracted after performing a lowercase transformation of the words, removing stop-words and/or stemming the words of each message of the set NonSpamSet 221P.

In step 303, for each extracted potential spam term of the set SpamSet 221N a frequency (Fs1-N) and a score (Ss1-N) may be determined (e.g. as attributes of the extracted term). The frequency is the number of messages in the set SpamSet 221N containing the term divided by the total number of messages in the set SpamSet 221N. The frequency and the score may be stored in the vocabulary SpamSetVocabulary 223N in association with the respective term. For the set NonSpamSet 221P, for each extracted term of the set NonSpamSet 221P a frequency (Fns1-N) and a score (Sns1-N) may be determined (e.g. as attributes of the extracted term). The frequency is the number of messages in the set NonSpamSet 221P containing the term divided by the total number of messages in the set NonSpamSet 221P. The frequency and the score may be stored in the vocabulary NonSpamSetVocabulary 223P in association with the respective term.

If the extracted term is a term that is present in the knowledge base 127, the score may be the score stored in the knowledge base 127 in association with the term and the term may be tagged as an existing spam or non-spam term. If the extracted term is a term that is not present in the knowledge base 127 the score may be set to a predefined value (e.g. a dummy value such as zero) and the term may be tagged as a new term.

The vocabulary SpamSetVocabulary 223N may thus comprise terms of the messages of SpamSet 221N that are already in the knowledge base 127, and other terms of the messages of SpamSet 221N that are not in the knowledge base 127 in association with their frequency and score.

For the set NonSpamSet 221P, the vocabulary 223P may thus comprise terms of the messages of NonSpamSet 221P that are already in the knowledge base 127, and other terms of the messages of NonSpamSet 221P that are not in the knowledge base 127 in association with their frequency and score. The number of entries (terms and associated frequencies and scores) in each of NonSpamSetVocabulary 223P and vocabulary SpamSetVocabulary 223N may or may not be the same.

The present method may select terms that have a high frequency because they are candidate to become indicators of spam or nom-spam messages.

In step 305, the terms whose score is zero and whose frequency is above a given threshold (e.g. 70%) may be selected from the vocabulary SpamSetVocabulary 223N. This step may for example further comprise filtering or selecting among those selected terms only those terms that are language entities such as nouns, locations, dates, etc. For determining part-of-speech like verbs, nouns, dates, etc. a natural language parsing tool may be used. For example, NLP libraries like Apache OpenNLP, WordNet, etc. may be used to detect the NLP tag of the term. This step 305 may result in a set of candidates SpamSetCandidates 225N comprising term candidates term_s_cand1-term_s_candN. For the set NonSpamSet 221P, the terms whose score is zero and whose frequency is above a given threshold (e.g. 70%) may be selected from the vocabulary 223P. This step may for example further comprise filtering or selecting among those selected terms only those terms that are language entities such as nouns, locations, dates, etc. This step may result in a set of candidates NonSpamSetCandidates 225P comprising term candidates term_ns_cand1-term_ns_candN. The number of candidates (terms) in each of the set of candidates NonSpamSetCandidates 225P and the set of candidates SpamSetCandidates 225N may or may not be the same.

In step 307, for the SpamSet 221N, the set of candidates NonSpamSetCandidates 225P may be subtracted from the set of candidates SpamSetCandidates 225N, in order to eliminate the spam terms candidates that are also present with high frequency in non-spam messages. As those eliminated terms may introduce ambiguity, such that they cannot be considered as identifiers of spam. In this way, the present method may provide a set of terms 227N (referred to as SpamSetFilteredCandidates) that are very common in spam messages only and that are not part of the knowledge base 127.

For the NonSpamSet 221P, the set of candidates SpamSetCandidates 225N may be subtracted from the set of candidates NonSpamSetCandidates 225P, in order to eliminate the non-spam terms candidates that are also present with high frequency in spam messages. As those eliminated terms may introduce ambiguity, such that they cannot be considered as identifiers of positivity. In this way, the present method may provide a set of terms 227P (referred to as NonSpamSetFilteredCandidates) that are very common in no-spam messages only and that are not part of the knowledge base 127.

For each candidate (SpamCandidate: term_s_cand1-term_s_candM) of the set of candidates SpamSetFilteredCandidates 227N that result from step 307 (after the subtraction) a score may be assigned to the candidate in step 309. The score of the candidate may be defined or calculated as function of the weighted sum of the scores of the terms already present in the knowledge base 127:

$$\text{score}(SpamCandidate) =$$
$$freq(SpamCandidate) * \frac{1}{N}\sum_{i=1}^{N}[freq(\text{spam\_term}_i) * \text{score}(\text{spam\_term}_i)] *$$
$$[1 + a1 * \text{freq\_moved\_to\_spam}(SpamCandidate) +$$
$$b1 * \text{freq\_blacklisted}(SpamCandidate)].$$

where spam_term$_i$ varies in the subset of vocabulary SpamSetVocabulary 223N of known spam terms already included in the knowledge base 127, and N is the cardinality of that subset. The score value may be further adjusted by using correction factors taking into account, whether messages comprising SpamCandidate have been re-classified by the user and/or have been classified based on the sender being blacklisted.

For each candidate (NonSpamCandidate: term_ns_cand1-term_ns_candM) of the set of candidates NonSpamSetFilteredCandidates 227P that result from step 307 (after the subtraction) a score may be calculated and assigned to the candidate in step 309. The score of the candidate may be calculated or defined as function of the weighted sum of the scores of the terms already present in the knowledge base 127:

$$\text{score}(NonSpamCandidate) = freq(NonSpamCandidate) *$$
$$\frac{1}{N}\sum_{i=1}^{N}[freq(\text{non-spam\_term}_i) * \text{score}(\text{non-spam\_term}_i)] *$$
$$[1 + a2 * \text{freq\_moved\_to\_non-spam}(NonSpamCandidate) +$$
$$b2 * \text{freq\_whitelisted}(NonSpamCandidate)].$$

where spam_term$_i$ varies in the subset of NonSpamSetVocabulary 223P of known non-spam terms already included in the knowledge base 127, and N is the cardinality of such subset. The score value may be further adjusted by using correction factors taking into account, whether messages comprising NonSpamCandidate have been re-classified by the user and/or have been classified based on the sender being whitelisted.

The number of candidates (terms) in each of the set of candidates NonSpamSetFilteredCandidates 227P and the set of candidates SpamSetFilteredCandidates 227N may or may not be the same.

In step 311, each candidate (term_s_cand1-term_s_candM, term_ns_cand1-term_ns_candM) may be stored in the knowledge base 127 in association with the score and/or the frequency of each candidate.

Figure 4:
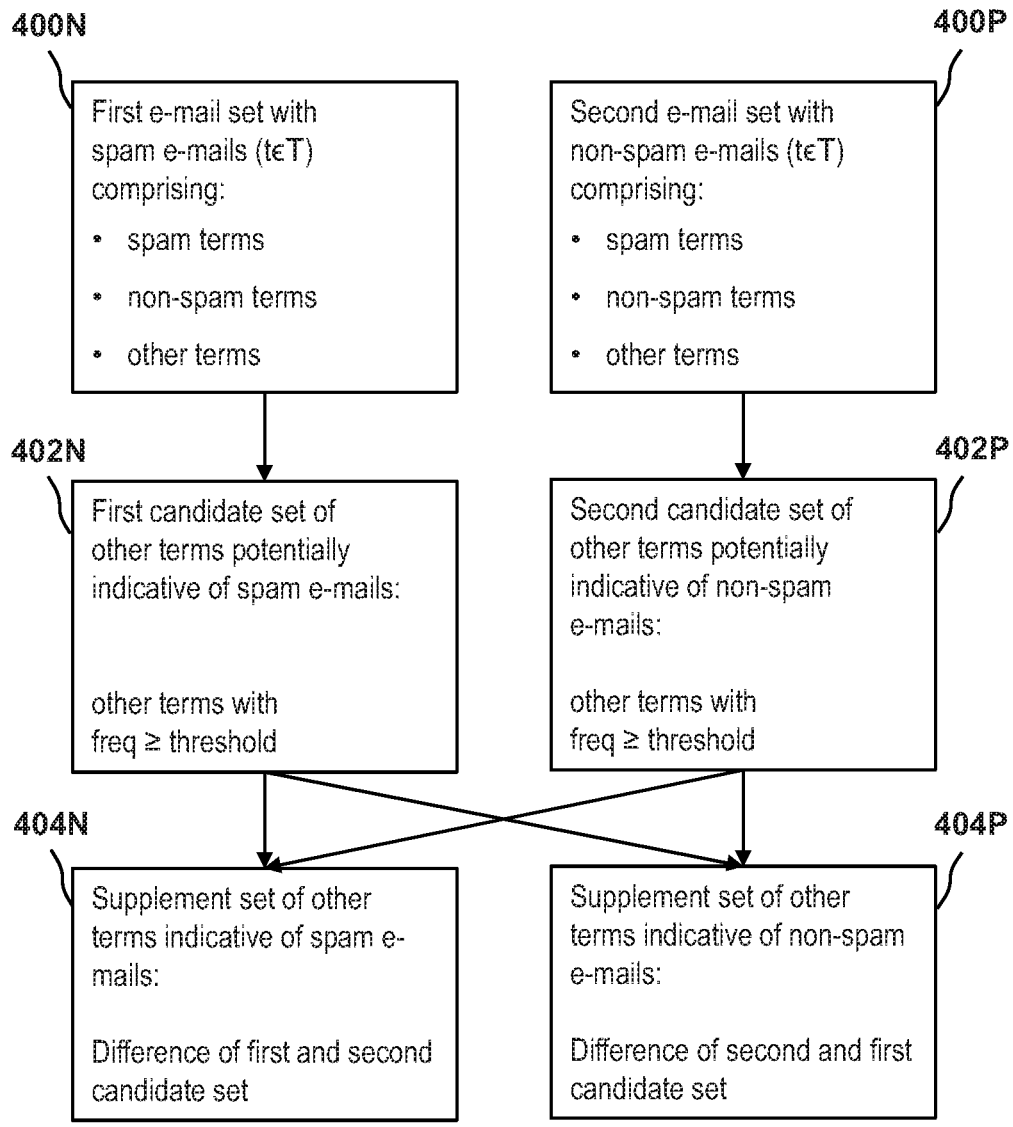
FIG. 4 is a flowchart of another example method for updating the knowledge base of the spam analysis and detection system.

FIG. 4 is a flowchart of another example method for updating the knowledge base 127 of a spam analysis and detection system 100. The method may calculate new candidate spam terms as well as new candidate non-spam terms based on a first set of emails in the spam folder comprising spam messages and on a second set of emails in the other folders comprising non-spam messages.

For example, emails related to a time window T are collected. For example, emails received at a time t during a most recent time window T, like e.g. the last 10 days, are collected and assigned to two sets of email messages a first email set 400N and a second email set 400P. Alternatively or in addition all emails moved to one or more spam folders or non-spam folders during the respective time window T may be taken into account. The first email set 400N may comprise email messages currently classified as spam messages. The second email set 400P may comprise email messages currently classified as non-spam messages. The spam messages comprised by the first email set 400N as well as the messages comprised by the second email set 400P may each comprise terms indicative for spam messages, terms indicative for non-spam messages and other terms for which it is neither known that they are indicative for spam messages nor that they are indicative for non-spam messages.

Other terms that are not present in the knowledge base, i.e. which are neither considered indicative for spam messages nor for non-spam messages yet, may be extracted from the email messages comprised by the first email set 400N and second email set 400P, in case their frequency of occurrence within the respective set of email messages 400N, 400P is greater than a configurable threshold. For each of the two email sets 400N, 400P different or thresholds may be used. Terms extracted from the first email set 400N may be assigned to a first candidate set 402N of candidate terms potentially indicative for spam messages, while terms extracted from the second email set 400P may be assigned to a second candidate set 402P of candidate terms potentially indicative for spam messages.

Finally, a first supplement set 404N of terms indicative for spam messages, which are to be added to the knowledge base, is obtained. In order to obtain the first supplement set 404N, e.g. a set difference of the first candidate set 402N and the second candidate set 402P is calculated, i.e. all terms of the first candidate set 402N which are also comprised by the second candidate set 402P are subtracted from the first candidate set 402N. Furthermore, a second supplement set 404P comprising terms indicative for non-spam messages, which are to be added to the knowledge base, is obtained. In order to obtain the second supplement set 404P, e.g. a set difference of the second candidate set 402P and the first candidate set 402N is calculated, i.e. all terms of the second candidate set 402P which are also comprised by the first candidate set 402N are subtracted from the second candidate set 402P.

Figure 5:
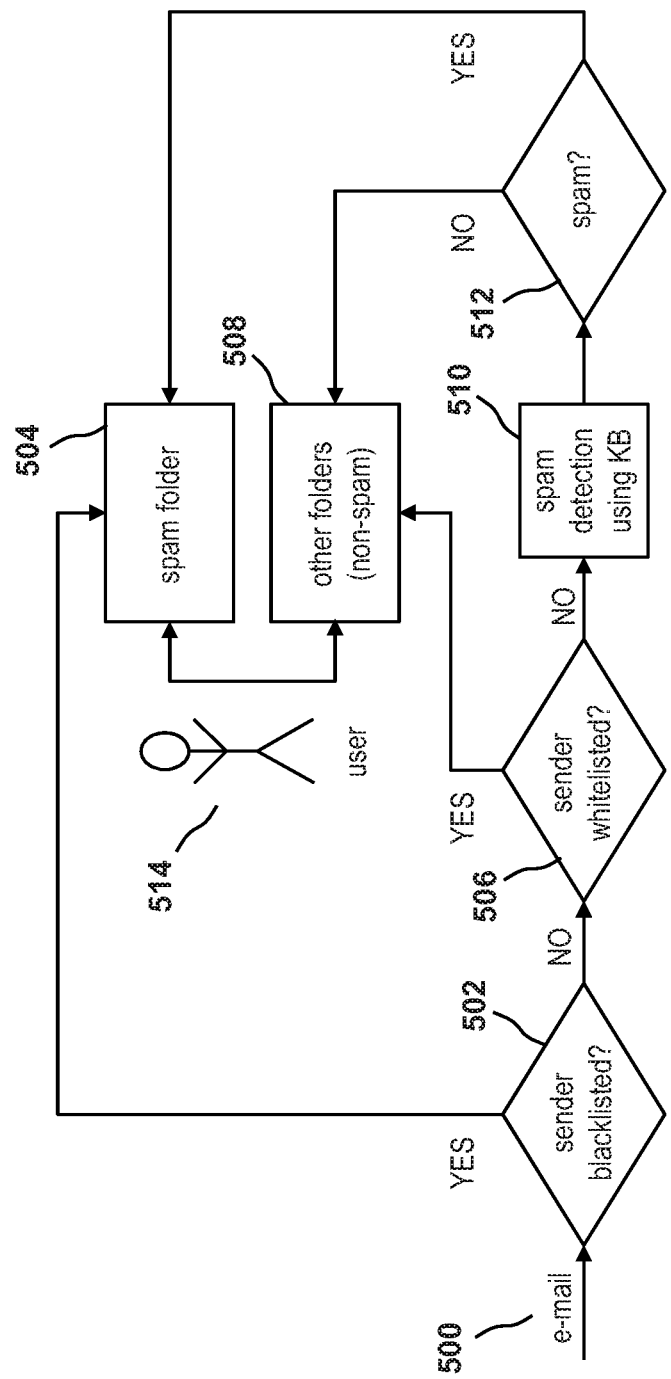
FIG. 5 is a flowchart of another example method for updating the knowledge base of the spam analysis and detection system.

FIG. 5 shows a flowchart of an exemplary method for detecting spam. In step 500, an incoming email is received. In step 502, it is checked whether the sender of the email is blacklisted. In case the sender is blacklisted, the email is moved to a spam folder 504 for spam messages, i.e. classified as spam. In case the sender is not blacklisted, the method continuous with step 506. In step 506, it is checked whether the sender of the email is whitelisted. In case the sender is whitelisted, the email is stored in another folder 508 for non-spam messages, i.e. classified as non-spam. According to alternative embodiments, steps 502 and 506 may be interchanged, i.e. it may be first checked whether the sender is whitelisted and afterwards checked whether the sender is backlisted. In case the sender is not whitelisted, the method continuous with step 510. In step 510, a spam analysis is performed using e.g. the knowledge base of FIG. 1.

The spam analysis may comprise extracting from the email all spam terms as well as all non-spam terms identified by the knowledge base. Receiving from the knowledge base the score values assigned to the extracted spam and non-spam terms and performing a first algebraic sum of the (absolute values of the) score values of the spam messages and a second sum of the score values of the non-spam messages. In case the first sum is greater than the second sum, the email is classified as a spam message; otherwise it is classified as a non-spam message. In case the both sums are equal, the email is classified as a spam message according to an embodiment. According to an alternative embodiment, the email is classified as a non-spam message in case both sums are equal.

For example, N terms tagged as existing spam terms of the knowledge base and M terms tagged existing spam terms of the knowledge base may be extracted from the email. In case of $$\sum_{i=1}^{N} |\text{score}(\text{spam\_term}_i)| - \sum_{j=1}^{M} |\text{score}(\text{non-spam\_term}_j)| > 0,$$

the email may be classified as a spam message and in case of $$\sum_{j=1}^{N} |\text{score}(\text{non-spam\_term}_j)| - \sum_{i=1}^{M} |\text{score}(\text{spam\_term}_i)| > 0,$$

It may be classified as a non-spam message. In case only positive score values are stored in the knowledge base, it is not necessary to explicitly consider absolute values.

In step 512, it is checked based on the results of the spam analysis whether the email is a spam message or a non-spam message. In case the email is identified to be a spam message, it is moved to the spam folder 504. In case the email is identified to be a non-spam message, it is moved to the non-spam folder 508. In step 514, the user may check the results of the spam detection, e.g. while checking the content of newly received emails. In case an email has been stored in spam folder 504 which the user does not consider to be a spam message, the respective email may be moved to a non-spam folder 508 due to a user move command. In case an email has been stored a non-spam folder 508 which the user considers to be a spam message, the respective email may be moved to a spam folder 504 due to a user move command. From spam folder 504 emails received during a most recent time window may be collected and assigned to the first email set 400N of FIG. 4. In addition, emails from non-spam folder 508 received during a most recent time window may be collected and assigned to the second email set 400P of FIG. 4.

The events of 'new spam', i.e. moving an email to spam folder 504, 'new non-spam', i.e. moving an email to non-spam folder 508, 'user moved to spam', i.e. moving an email from a non-spam folder 508 to the spam folder 504 due to a user command, 'user moved to ham', i.e. moving an email from the spam folder 504 to a non-spam folder 508 due to a user command, may be captured and logged. The logged events may be taken into account, when the knowledge base is e.g. periodically updated on a shifting time window. For example, the knowledge base may be updated daily using a time window of the last 10 days. In other words, all emails moved to one of the folders 504, 508 during the last 10 days are considered and assigned to the email sets 400N, 400P of FIG. 4.

Aspects of the present invention are described herein with reference to flowchart illustrations and/or block diagrams of methods, apparatus (systems), and computer program products According to embodiments, of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products According to embodiments, of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for updating a knowledge base of a spam detection system for email messages, the knowledge base being operable for storing natural language terms and, for each natural language term in the stored natural language terms, a score value related to the natural language term, the score value specifying whether the natural language term is indicative for a spam message or a non-spam message, the method comprising:

creating a first email set of email messages related to a time window, the first email set comprising email messages currently classified as spam messages;

creating a second email set of email messages related to the time window, the second email set comprising email messages currently classified as non-spam messages;

extracting a natural language term that is not present in the knowledge base from one of the email messages contained in one of the first email set or the second email set thereby forming an extracted natural language term;

storing the extracted natural language term in a first candidate set of candidate terms potentially indicative for spam messages or a second candidate set of candidate terms potentially indicative for non-spam messages based on a frequency of occurrence of the extracted natural language term in the email messages of the first email set or the second email set, respectively;

calculating a score value of the extracted natural language term stored in the first candidate set using the following formula, wherein score(c_spam_term) represents the score value of a spam term:

$$\text{score}(\text{c\_spam\_term}) = \\ \textit{freq}(\text{c\_spam\_term}) * \frac{1}{N} \sum_{i=1}^{N} [\textit{freq}(\text{spam\_term}_i) * \text{score}(\text{spam\_term}_i)] * \\ [1 + a1 * \text{freq\_moved\_to\_spam}(\text{c\_spam\_term}) + \\ b1 * \text{freq\_blacklisted}(\text{c\_spam\_term})],$$

and wherein freq(c_spam_term) is the frequency of occurrence of the extracted natural language term in the first email set, N is the number of terms comprised by the email messages of the first email set which are tagged in a vocabulary as existing spam terms, the sum from i=1 to N is the sum over the N terms tagged in the vocabulary as the existing spam terms, freq(spam_term$_i$) is the frequency of the $i_{th}$ term tagged as an existing spam term in the first email set, score(spam_term$_i$) is the score value of the $i_{th}$ term tagged in the vocabulary as an existing spam term, a1 and b1 are positive weighting factors, freq_moved_to_spam(c_spam_term) is the frequency of occurrence of the extracted natural language term in a first subset of the first email set comprising email messages which have been moved to the first email set due to a user move command, and freq_blacklisted(c_spam_term) is the frequency of occurrence of the extracted natural language term in a second subset of the first email set comprising email messages which have been moved to the first email set due to having a sender which is blacklisted; and storing the extracted natural language term and the calculated score value into the knowledge base.

2. The method of claim 1, wherein the method comprises storing the extracted natural language term in the first candidate set of candidate terms potentially indicative for spam messages if the frequency of occurrence of the extracted natural language term in the email messages of the first email set of email messages is greater than or equal to a first threshold.

3. The method of claim 2, wherein the method comprises storing the extracted natural language term in the second candidate set of candidate terms potentially indicative for non-spam messages if the frequency of occurrence of the extracted natural language term in email messages of the second email set of email messages is greater than or equal to a second threshold.

4. The method of claim 3, wherein the method comprises calculating a first set difference of the first candidate set and the second candidate set in order to obtain a first supplement set of extracted natural language terms indicative for spam messages to be added to the knowledge base.

5. The method of claim 3, wherein the method comprises calculating a second set difference of the second candidate set and the first candidate set in order to obtain a second supplement set of extracted natural language terms indicative for non-spam messages to be added to the knowledge base.

6. The method of claim 1, wherein the frequency of occurrence is the fraction of email messages comprising the extracted natural language term of the email set that contains the email message from which the natural language term is extracted.

7. The method of claim 1, further comprising for each of the first email set and the second email set:
identifying one or more natural language terms in one or more email messages of the corresponding email set;
creating a vocabulary comprising the identified natural language terms, wherein each identified natural language term is tagged as a new natural language term, as an existing natural language spam term or as an existing natural language non-spam term in the knowledge base, wherein extracting the natural language term comprises selecting a natural language term of the vocabulary being tagged as a new natural language term.

8. The method of claim 1, wherein the calculated score value of a non-spam term, represented as score(c_non-spam_term), of the extracted natural language term stored in the second candidate set is defined using the following formula:

$$\text{score}(\text{c\_non-spam\_term}) = \textit{freq}(\text{c\_non-spam\_term}) * \\ \frac{1}{M} \sum_{i=1}^{M} [\textit{freq}(\text{non-spam\_term}_i) * \text{score}(\text{non-spam\_term}_i)] * \\ [1 + a2 * \text{freq\_moved\_to\_non-spam}(\text{c\_non-spam\_term}) + \\ b2 * \text{freq\_whitelisted}(\text{c\_non-spam\_term})],$$

wherein freq(c_non-spam_term) is the frequency of occurrence of the extracted natural language term in the second email set, M is the number of terms comprised by the messages of the second email set which are tagged in a vocabulary as existing non-spam terms, the sum from i=1 to M is the sum over the M terms tagged in the vocabulary as the existing non-spam terms, freq(non-spam_term$_i$) is the frequency of the $i_{th}$ term tagged as an existing non-spam term in the second email set, score(non-spam_term$_i$) is the score value of the $i_{th}$ term tagged in the vocabulary as an existing non-spam term, a2 and b2 are positive weighting factors, freq_moved_to_non-spam(c_non-spam_term) is the frequency of occurrence of the extracted natural language term in a second subset of the second email set comprising email messages which have been moved to the second email set due to the user move command, and freq_whitelisted (c_non-spam_term) is the frequency of occurrence of the extracted natural language term in the second subset of the second email set comprising email messages which have been moved to the second email set due to having a sender which is whitelisted.

9. The method of claim 1, in case one or more email messages are moved to one of the email sets due to a user move command, calculated score values of one or more of spam or non-spam natural language terms comprised by the one or more email messages are updated taking into account that a respective email message has been moved due to a user move command.

10. The method of claim 9, in case one or more email messages are moved to the first email set due to the user move command forming a first subset of the first email set, calculated score values score(spam_term) of spam natural language terms which are comprised by the moved email messages and which are tagged in a vocabulary as existing spam natural language terms are each increased:

$$\text{score}(\text{spam\_term}) = \text{score}(\text{spam\_term}) * [1 + a4 * \text{freq\_moved\_to\_spam}(\text{spam\_term})],$$

wherein freq_moved_to_spam(spam_term) is the frequency of occurrence of a respective spam natural language term in the first subset and a4 is a positive weighting factor.

11. The method of claim 10, further comprising:
calculated score values score(non-spam_term) of non-spam natural language terms which are comprised by the moved email messages and which are tagged in a vocabulary as existing non-spam natural language terms are each decreased:

score(non-spam_term)=score(non-spam_term)*[1−
a5*freq_moved_to_spam(non-spam_term)], wherein freq_moved_to_spam(non-spam_term) is the frequency of occurrence of a respective non-spam natural language term in the first subset and a5 is a positive weighting factor.

12. The method of claim 9, in case one or more email messages are moved to the second email set due to the user move command forming a second subset of the second email set, calculated score values score(non-spam_term) of non-spam natural language terms which are comprised by the moved email messages and which are tagged in a vocabulary as existing non-spam natural language terms are each increased:

score(non-spam_term)=score(non-spam_term)*[1+
a6*freq_moved_to_non-spam(non-spam_term)], wherein freq_moved_to_non-spam(non-spam_term) is the frequency of occurrence of a respective non-spam natural language term in the second subset and a6 is a positive weighting factor.

13. The method of claim 12, further comprising:
calculated score values score(spam_term) of spam natural language terms which are comprised by the moved email messages and which are tagged in a vocabulary as existing spam natural language terms are each decreased:

score(spam_term)=score(spam_term)*[1−
a7*freq_moved_to_non-spam(spam_term)], wherein freq_moved_to_non-spam(spam_term) is the frequency of occurrence of a respective spam natural language term in the second subset and a7 is a positive weighting factor.

14. The method of claim 1, wherein the method further comprises:
receiving within the time window multiple email messages to be added to the email sets in order to update the email sets;
classifying each of the received email messages either as a spam message or as a non-spam message and based on the classification adding the respective email message to one of the email sets, wherein email messages from senders which are blacklisted are classified as spam message, email messages from senders which are whitelisted are classified as non-spam message, and email messages from senders which are neither blacklisted nor whitelisted are classified as spam or non-spam message depending on their content.

15. The method of claim 1, wherein the method further comprises updating the time window and removing from the email sets email messages related to a time outside of the updated time window.

16. The method of claim 1, wherein the method comprises:
monitoring the frequency of occurrence of one or more extracted natural language terms, which are present in the knowledge base, in one of the first email set or the second email set; and
updating the score value of a respective natural language term or removing the respective natural language term from the knowledge base based on the monitoring.

17. A computer program product comprising a non-transitory non-volatile computer-readable storage medium having computer-readable program code embodied therewith, the computer-readable program code being configured for updating a knowledge base of a spam detection system for email messages, the knowledge base being operable for storing natural language terms and, for each natural language term in the stored natural language terms, a score value related to the natural language term, the score value specifying whether the natural language term is indicative for a spam message or a non-spam message, wherein the computer-readable program code, when executed on a computer system, causes the computer system to:
create a first email set of email messages related to a time window, the first email set comprising email messages currently classified as spam messages;
create a second email set of email messages related to the time window, the second email set comprising email messages currently classified as non-spam messages;
extract a natural language term that is not present in the knowledge base from one of the email messages contained in one of the first email set or the second email set thereby forming an extracted natural language term;
store the extracted natural language term in a first candidate set of candidate terms potentially indicative for spam messages or a second candidate set of candidate terms potentially indicative for non-spam messages based on a frequency of occurrence of the extracted natural language term in the email messages of the first email set or the second email set, respectively;
calculate a score value of the extracted natural language term stored in the first candidate set using the following formula, wherein score(c_spam_term) represents the score value of a spam term:

$$\text{score}(c\_spam\_term) = \\ freq(c\_spam\_term) * \frac{1}{N} \sum_{i=1}^{N} [freq(spam\_term_i) * score(spam\_term_i)] * \\ [1 + a1 * freq\_moved\_to\_spam(c\_spam\_term) + \\ b1 * freq\_blacklisted(c\_spam\_term)],$$

and wherein freq(c_spam_term) is the frequency of occurrence of the extracted natural language term in the first email set, N is the number of terms comprised by the email messages of the first email set which are tagged in a vocabulary as existing spam terms, the sum from i=1 to N is the sum over the N terms tagged in the vocabulary as the existing spam terms, freq(spam_term$_i$) is the frequency of the i$_{th}$ term tagged as an existing spam term in the first email set, score(spam_term$_i$) is the score value of the i$_{th}$ term tagged in the vocabulary as an existing spam term, a1 and b1 are positive weighting factors, freq_moved_to_spam(c_spam_term) is the frequency of occurrence of the extracted natural language term in a first subset of the first email set comprising email messages which have been moved to the first email set due to a user move command, and freq_blacklisted(c_spam_term) is the frequency of occurrence of the extracted natural language term in a second subset of the first email set comprising email messages which have been moved to the first email set due to having a sender which is blacklisted; and store the extracted natural language term and the calculated score value into the knowledge base.

18. A computer system for updating a knowledge base of a spam detection system for email messages, the knowledge base being operable for storing natural language terms and, for each natural language term in the stored natural language terms, a score value related to the natural language term, the score value specifying whether the natural language term is indicative for a spam message or a non-spam message, the computer system comprising:

a processor; and a memory coupled to the processor, wherein the memory comprises instructions which, when executed by the processor, cause the processor to:

create a first email set of email messages related to a time window, the first email set comprising email messages currently classified as spam messages;

create a second email set of email messages related to the time window, the second email set comprising email messages currently classified as non-spam messages;

extract a natural language term that is not present in the knowledge base from one of the email messages contained in one of the first email set or the second email set thereby forming an extracted natural language term;

store the extracted natural language term in a first candidate set of candidate terms potentially indicative for spam messages or a second candidate set of candidate terms potentially indicative for non-spam messages based on a frequency of occurrence of the extracted natural language term in the email messages of the first email set or the second email set, respectively;

calculate a score value of the extracted natural language term stored in the first candidate set using the following formula, wherein score(c_spam_term) represents the score value of a spam term:

$$\text{score(c\_spam\_term)} = \\ \textit{freq}(\text{c\_spam\_term}) * \frac{1}{N} \sum_{i=1}^{N} [\textit{freq}(\text{spam\_term}_i) * \text{score}(\text{spam\_term}_i)] * \\ [1 + a1 * \text{freq\_moved\_to\_spam}(\text{c\_spam\_term}) + \\ b1 * \text{freq\_blacklisted}(\text{c\_spam\_term})],$$

and wherein freq(c_spam_term) is the frequency of occurrence of the extracted natural language term in the first email set, N is the number of terms comprised by the email messages of the first email set which are tagged in a vocabulary as existing spam terms, the sum from i=1 to N is the sum over the N terms tagged in the vocabulary as the existing spam terms, freq(spam_term$_i$) is the frequency of the i$_{th}$ term tagged as an existing spam term in the first email set, score(spam_term$_i$) is the score value of the i$_{th}$ term tagged in the vocabulary as an existing spam term, a1 and b1 are positive weighting factors, freq_moved_to_spam(c_spam_term) is the frequency of occurrence of the extracted natural language term in a first subset of the first email set comprising email messages which have been moved to the first email set due to a user move command, and freq_blacklisted(c_spam_term) is the frequency of occurrence of the extracted natural language term in a second subset of the first email set comprising email messages which have been moved to the first email set due to having a sender which is blacklisted; and store the extracted natural language term and the calculated score value into the knowledge base.

* * * * *